United States Patent

Singh et al.

[11] Patent Number: 5,773,041
[45] Date of Patent: Jun. 30, 1998

[54] MOLD CLAMPING SYSTEM

[75] Inventors: Anand P. Singh; Xianzhen Liu, both of Akron, Ohio

[73] Assignee: McNeil & NRM, Inc., Akron, Ohio

[21] Appl. No.: 873,317

[22] Filed: Jun. 11, 1997

[51] Int. Cl.[6] .................................................. B29C 33/30
[52] U.S. Cl. ....................................... 425/195; 425/192 R
[58] Field of Search ............................... 425/192 R, 195, 425/28.1

[56] References Cited

U.S. PATENT DOCUMENTS

| 4,580,959 | 4/1986  | Pizzorno et al. ........................ | 425/195 |
| 4,790,739 | 12/1988 | Manfredi ................................. | 425/195 |
| 4,955,799 | 9/1990  | Katayama et al. ...................... | 425/47  |
| 4,964,792 | 10/1990 | Katayama et al. ...................... | 425/32  |
| 5,259,742 | 11/1993 | Ichikawa et al. .                     |         |
| 5,271,727 | 12/1993 | Irie ......................................... | 425/34.1 |

*Primary Examiner*—James P. Mackey
*Attorney, Agent, or Firm*—Renner, Kenner, Greive, Bobak, Taylor & Weber

[57] ABSTRACT

Mold clamping apparatus (30) for selectively detachably securing a lower mold plate (20) mounting a lower mold section (M) relative to the lower platen (21), lower bolster (22) and lower housing (12) of a tire curing press (10) comprising, a plurality of bores (21', 22', 12') extending through the lower platen, the lower bolster and the lower housing, a tapered bore (71) in the lower mold plate, a locking rod (31) positioned in each of the bores and extending into the tapered bore, a contractible member (40) affixed to the lower platen and extending into the tapered bore when the lower mold plate is seated on the lower platen, a jam nut (33) mounted on the locking rod movable into and out of engagement with the contractible member, and a biasing assembly 55 urging the jam nut into contact with the contractible member for locking the contractible member in the tapered bore to secure the lower mold plate to the lower platen.

21 Claims, 6 Drawing Sheets

MOLD CLAMPING SYSTEM

TECHNICAL FIELD

The present invention relates generally to apparatus for detachably retaining mold sections for producing tires in a tire curing press. More particularly, the present invention relates to a mold clamping system for selectively retaining and releasing a lower mold section for tires with respect to a tire curing press. More specifically, the present invention relates to a mold clamping system for aligning and temporarily retaining a lower mold section for tires in a tire curing press which permits quick change to a different lower mold section for a tire having a different size and/or different tread pattern.

BACKGROUND ART

From the beginning of the tire manufacturing industry, mold retaining devices have been employed for detachably securing mold sections in tire curing presses. In general, it was necessary to retain an upper and lower mold section employed for forming tires in engagement with and fixed to heating platens which, in conjunction with various types of center mechanisms, provided suitable pressure and heat for the curing of a tire. Some type of mold retaining device was necessary to maintain the molds attached to the platens for travel therewith during the opening and closing of the press for the insertion of an uncured tire into position between the mold sections and the removal of the tire from between the mold sections subsequent to the curing operation. In addition, it is necessary that the mold sections retain a predetermined position during repeated curing operations and be sufficiently firmly attached to the platens, such that the mold sections can withstand the stripping operation of separating the cured tire from the mold sections subsequent to the curing operation.

For many years, it has also been common production practice in the tire industry to utilize tire curing presses to produce a variety of tire sizes having a myriad of different tread patterns, depending upon the type of tire being produced. As a result, it is necessary to frequently change the molds in tire curing presses to satisfy production requirements for the numerous different sizes and types of tires to meet the required production output of tire manufacturing facilities.

Historically, a plurality of bolts were employed to attach an upper mold section to the upper platen of a press and the lower mold section to the lower platen. While the use of three, four, or more bolts to attach each mold section was effective to meet press operation requirements, a number of significant disadvantages emerged.

In many instances, the process of changing molds was inordinately time consuming. In particular, it was necessary to first loosen and unthread a plurality of bolts and thereafter employ a forklift or other heavy equipment for removal of the mold sections from a tire curing press. Once unloaded, the forklift or the like loaded the new molds to be installed in the press and brought the molds into proximity to the mold cavity in the press. Installation of the replacement molds for a different tire required an extent of trial-and-error movement of the mold sections relative to their respective platens to align the bolt holes therein to receive the attaching bolts. Once alignment was effected, the bolts were threaded and tightened prior to resumption of operation of the tire curing press. Not infrequently, a substantial loss of production time resulted from the mold change operation as described above.

In addition to loss of valuable production time, mold change operations have presented a serious safety hazard. Mold sections for small passenger car size tires up through large truck tires employ molds weighing from hundreds to thousands of pounds. The necessity for press operators to be within the mold cavities for removing and inserting bolts poses a substantial safety risk should the upper mold section be accidentally dropped or should a tire curing press accidentally cycle from the fully open to the closed position. Thus, the conventional usage of bolts for mounting mold sections in a tire curing press has produced a significant continuing safety hazard over the years.

Both the difficulty in installing an upper mold section and the danger to operating personnel of a falling upper mold section have resulted in the adoption in recent years of upper mold section clamping devices. In this respect, clamp rods of various types have been inserted through the upper platens and bolsters of tire curing presses to control gripping elements which selectively engage and disengage upper mold sections or mold plates therefor. These upper mold section clamping devices are often actuated by rotating the clamp rods via operating cylinders or other drive mechanisms. The drive mechanisms are frequently provided with locking devices which prevent rotation of the clamp rods once an upper mold section is engaged and clamped. These mold clamping devices tend to be relatively complex and expensive and bring a substantial number of additional operating assemblies to the press configuration which must be maintained and repaired when necessary. Such upper mold section clamping devices have, however, achieved relatively wide acceptance, despite these drawbacks, due to the safety considerations involved.

In regard to lower mold clamping devices, hydraulically actuated lever arms have been proposed which project radially outwardly from the lower platen and bolster area to provide a clamping element movable into and out of engagement with a circumferential notch in the lower mold section or the mold plate therefor. Even more elaborate lower mold clamping devices have been proposed which employ parallelogram linkage devices that have circumferentially located centering members that engage centering members on the circumferential outside surface of a lower mold section. In order that the centering devices can move and thereby position the lower mold sections, bearings have been employed to support the lower mold section to permit the centering movement of the lower mold section. These lower mold clamping devices are normally cylinder actuated and provide a clamping element for securing a mold once it has been centered to a concentrically aligned position with the lower mold cavity and platen.

These lower mold clamping devices have not received wide acceptance because they are relatively complex and, as a result, expensive. In addition, some of these lower mold clamping devices include substantial structure which projects radially outwardly from the lower platen bolster and mold areas, such that they are prone to interference with other press operating mechanisms, can be easily damaged, or can themselves constitute an extent of safety hazard to operating personnel endeavoring to service or repair a tire curing press. Accordingly, conventional bolts remain in common use for retaining lower mold sections in tire curing presses.

DISCLOSURE OF THE INVENTION

Therefore, an object of the present invention is to provide a mold clamping system for a tire curing press which is operative to retain a lower mold section with its center line concentric with the center line of the mold cavity and lower platen of the press. Another object of the present invention is to provide such a clamping system which is capable of aligning a lower mold section center line relative to the center line of the press cavity and platen from a position proximate thereto. A further object of the present invention is to provide such a clamping system which is capable of effecting rapid release of a clamped lower mold section and the alignment and clamping of a different lower mold section to effect mold change in a press in a convenient manner and in a minimum of time such as to minimize down time of a tire curing press during the mold change operation to produce a different tire.

Another object of the present invention is to provide a lower mold clamping system which is positioned essentially within the confines of the lower platen bolster and housing of a tire curing press. A further object of the present invention is to provide such a mold clamping system which is located so as not to interfere with other press operating mechanisms, which is protected from accidental damage, and which does not interfere with service or repair of the press. Yet another object of the present invention is to provide such a mold clamping system which does not require manual operations by press operating personnel in the mold area between the upper and lower mold sections.

Another object of the present invention is to provide a lower mold clamping system which promotes easy location and seating of a lower mold section in its aligned position on the lower platen of a press. A further object of the present invention is to provide such a lower mold clamping system which mechanically clamps the lower mold section in its operating position. A further object of the present invention is to provide such a mold clamping system which may be employed with any type of upper mold clamping system currently used in the industry. Still another object of the present invention is to provide such a mold clamping system which is of relatively simple construction, is easy to install on new presses or as a retrofit for existing presses, and otherwise constitutes an advantageous contribution to the art without the drawbacks of more complex systems which have been proposed.

In general, the present invention contemplates mold clamping apparatus for selectively detachably securing a lower mold plate mounting a lower mold section relative to the lower platen, lower bolster and lower housing of a tire curing press, including a plurality of bores extending through the lower platen, the lower bolster and the lower housing, a tapered bore in the lower mold plate, a locking rod positioned in each of the bores and extending into the tapered bore, a contractible member affixed to the lower platen and extending into the tapered bore when the lower mold plate is seated on the lower platen, a jam nut mounted on the locking rod movable into and out of engagement with the contractible member, and a biasing element urging the jam nut into contact with the contractible member for locking the contractible member in the tapered bore to secure the lower mold plate to the lower platen.

PREFERRED EMBODIMENT FOR CARRYING OUT THE INVENTION

Figure 1:
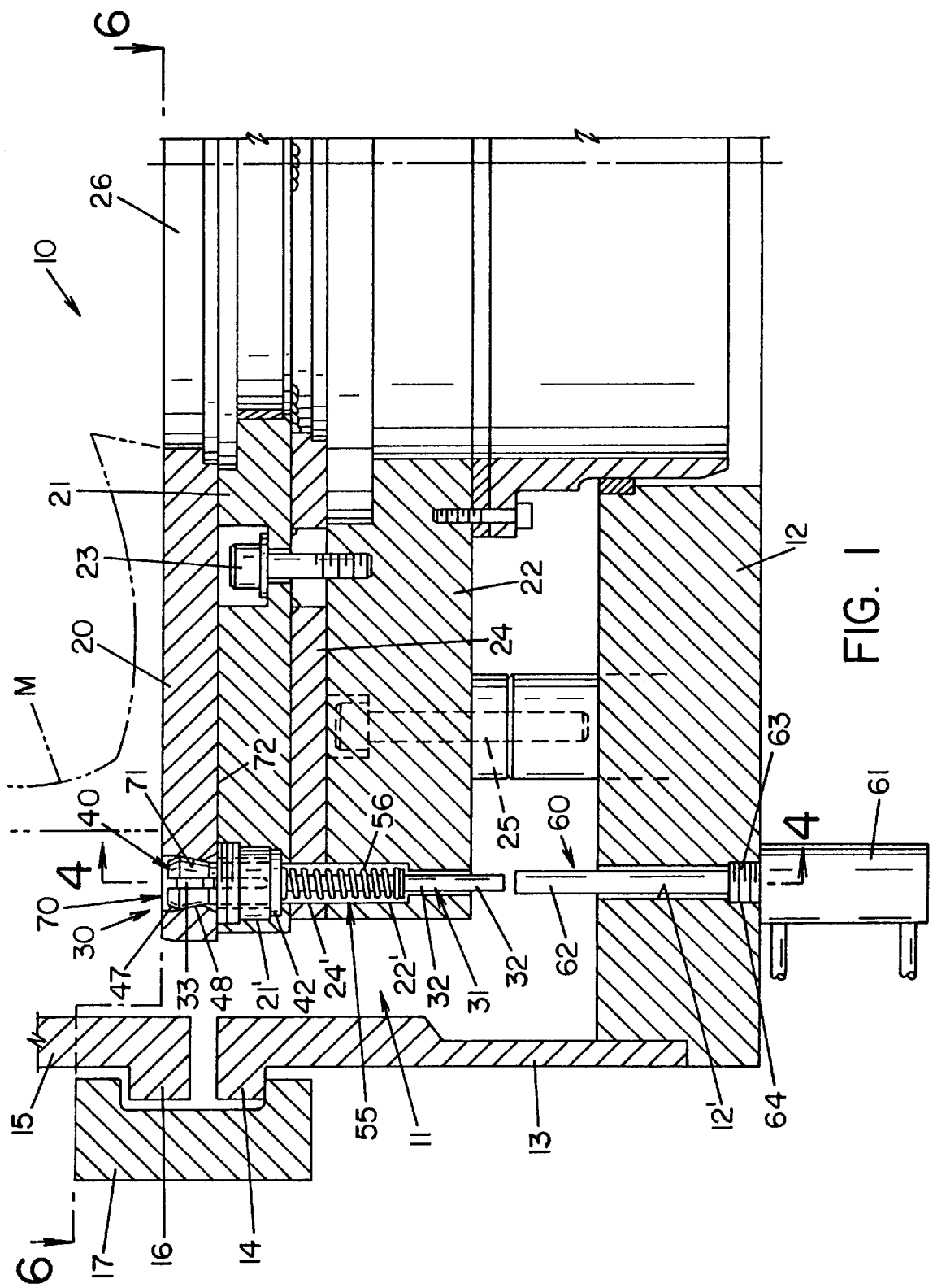
FIG. 1 is a fragmentary, vertical sectional view of a lower mold cavity of an exemplary tire curing press taken substantially along the line 1—1 of FIG. 6 showing the arrangement of a mold clamping assembly according to the concepts of the present invention in relation to principal press components.
Figure 6:
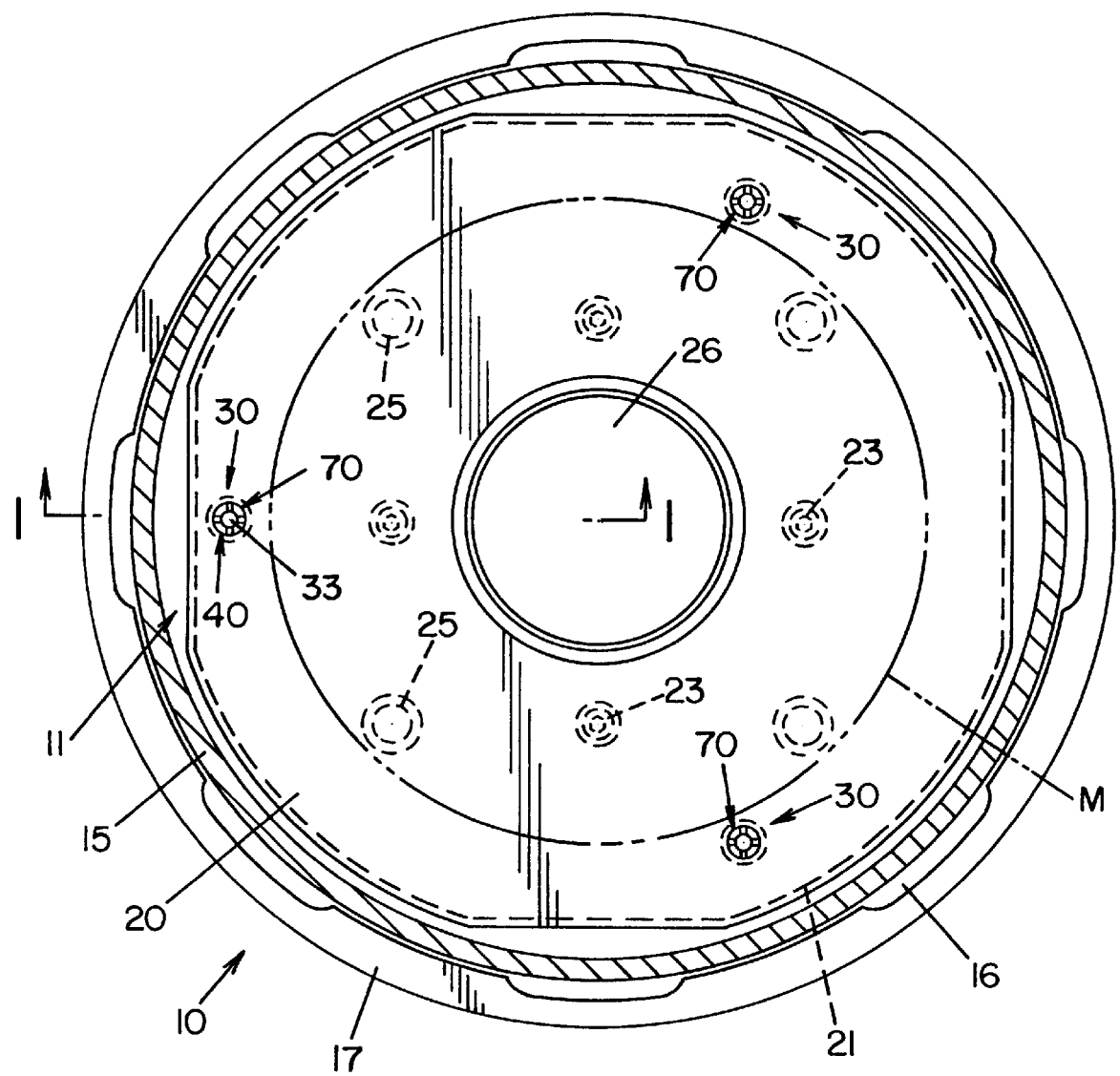
FIG. 6 is a top plan view taken substantially along line 6—6 of FIG. 1 of a lower mold cavity of a tire curing press showing an exemplary location of a plurality of mold clamping assemblies.

A portion of an exemplary tire curing press utilizing the concepts of the present invention is generally indicated by the numeral 10 in FIGS. 1 and 6 of the drawings. While a type of press commercialized in the industry by Applicants' assignee is depicted for exemplary purposes, it will be appreciated that the concepts of the present invention may be readily adapted to a variety of types and sizes of tire curing presses.

In FIGS. 1 and 6, a tire curing press lower mold cavity area, generally indicated by the numeral 11, is depicted. The lower mold cavity 11 is generally defined by a lower press housing 12 which is supported by a press base (not shown). Extending upwardly from lower press housing 12 is a cylindrical wall 13 which peripherally defines the lower mold cavity 11. The cylindrical wall 13 has a lower flange or lip 14 which extends radially outwardly of lower mold cavity 11. An upper cylindrical shell 15 is located above the cylindrical wall 13 and similarly encompasses an upper mold section and related components suspended from a press cross beam (not shown). The cylindrical shell 15 has an upper flange 16 which is selectively interengaged with the lower flange or lip 14 by a locking ring 17 which may be journaled on lower flange 14 for maintaining the press 10 locked in a closed position during the tire curing operation. Additional details of tire curing presses of this general type are shown in U.S. Pat. No. 4,332,536 and patents referred to therein.

Positioned centrally of the cylindrical wall 13 in the lower mold cavity 11 are support components for an exemplary lower mold section M. Directly underlying and supporting the lower mold section M is a lower mold plate 20. The lower mold section M may be attached to the lower mold plate 20 by a plurality of bolts (not shown). Alternatively, the lower mold section M and the lower mold plate 20 may be formed as a single unit. In the former instance depicted herein, the combined lower mold section M and lower mold plate 20 are replaced in the tire curing press 10 when a mold change is effected to produce a different tire configuration. Underlying and supporting the lower mold plate 20 is a lower platen 21 which may be of any desired conventional construction. The lower platen 21 is attached to a lower bolster 22 as by a plurality of suitable fasteners 23. The lower platen 21 may be spaced from the lower bolster 22 by a lower insulating layer 24 whereby the transfer of heat from the lower platen 21 is primarily to the lower mold plate 20 and the lower mold section M. The lower bolster 22 is supported by rods of squeeze cylinders or adjusting screws (not shown) to which it is attached by fasteners 25.

The lower mold section M, lower mold plate 20, lower platen 21, and lower bolster 22 are of a generally annular configuration to form a circular central cavity 26 that receives a center mechanism (not shown) which may be any of numerous types known in the art. The above-described press environment constitutes merely an example of one type of tire curing press to which the concepts of the present invention may be applied.

Mold clamping assemblies, generally indicated by the numeral 30, are shown in FIGS. 1–4 and 6 of the drawings. FIGS. 1 and 6 particularly depict the position of the mold clamping assemblies 30 in relation to the overall structure of the tire curing press 10. As seen, the mold clamping assemblies 30 are positioned radially proximate the outer periphery of lower platen 21 and in a plurality of locations circumferentially of lower platen 21. FIG. 6 shows three equiangularly-spaced mold clamping assemblies 30 arranged about the lower platen 21. It is to be appreciated that four or more mold clamping assemblies 30 may be provided for a particular platen 21, depending upon the size, construction, and loading parameters on lower platen 21 and mold clamping assemblies 30 of a particular press configuration. Since all of the three mold clamping assemblies 30 may be structurally and operationally identical, only a single mold clamping assembly 30 is hereinafter detailed.

Figure 2:
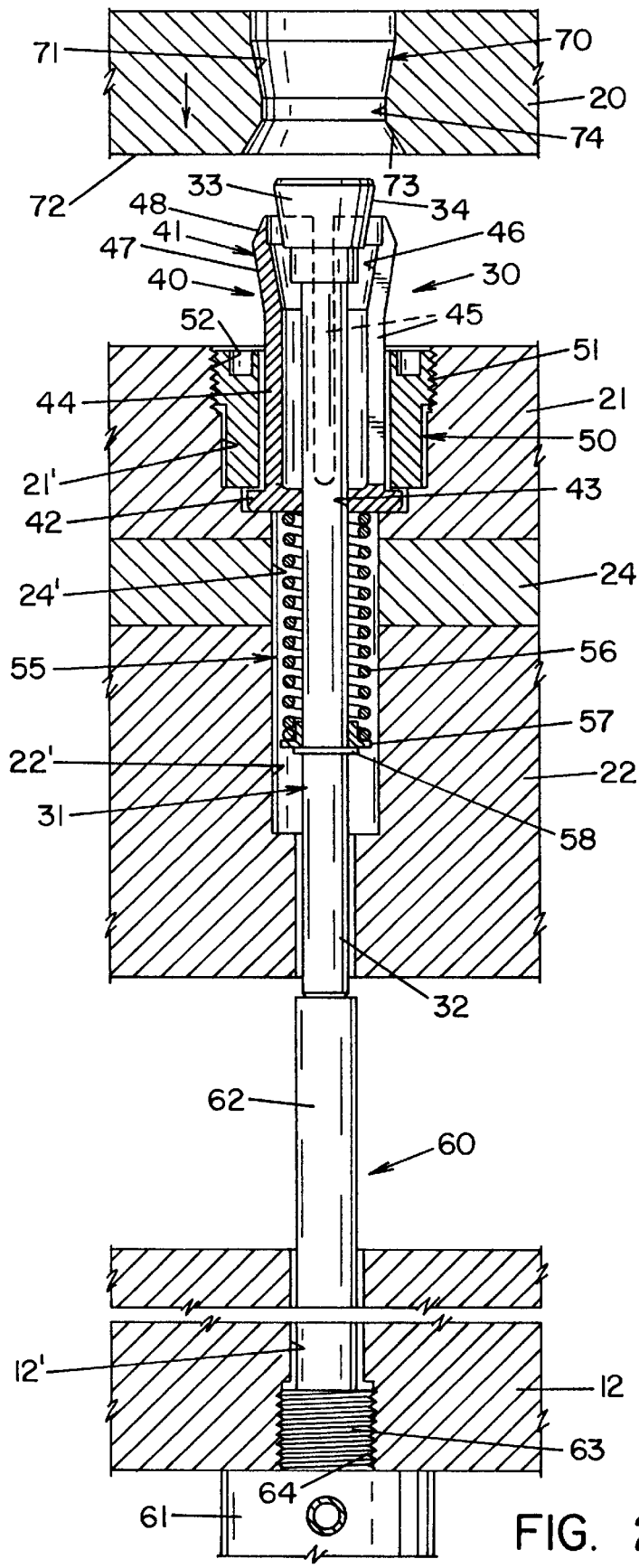
FIG. 2 is an enlarged, fragmentary, vertical sectional view of the mold clamping assembly of FIG. 1 positioned to receive a lower mold plate thereon.
Figure 3:
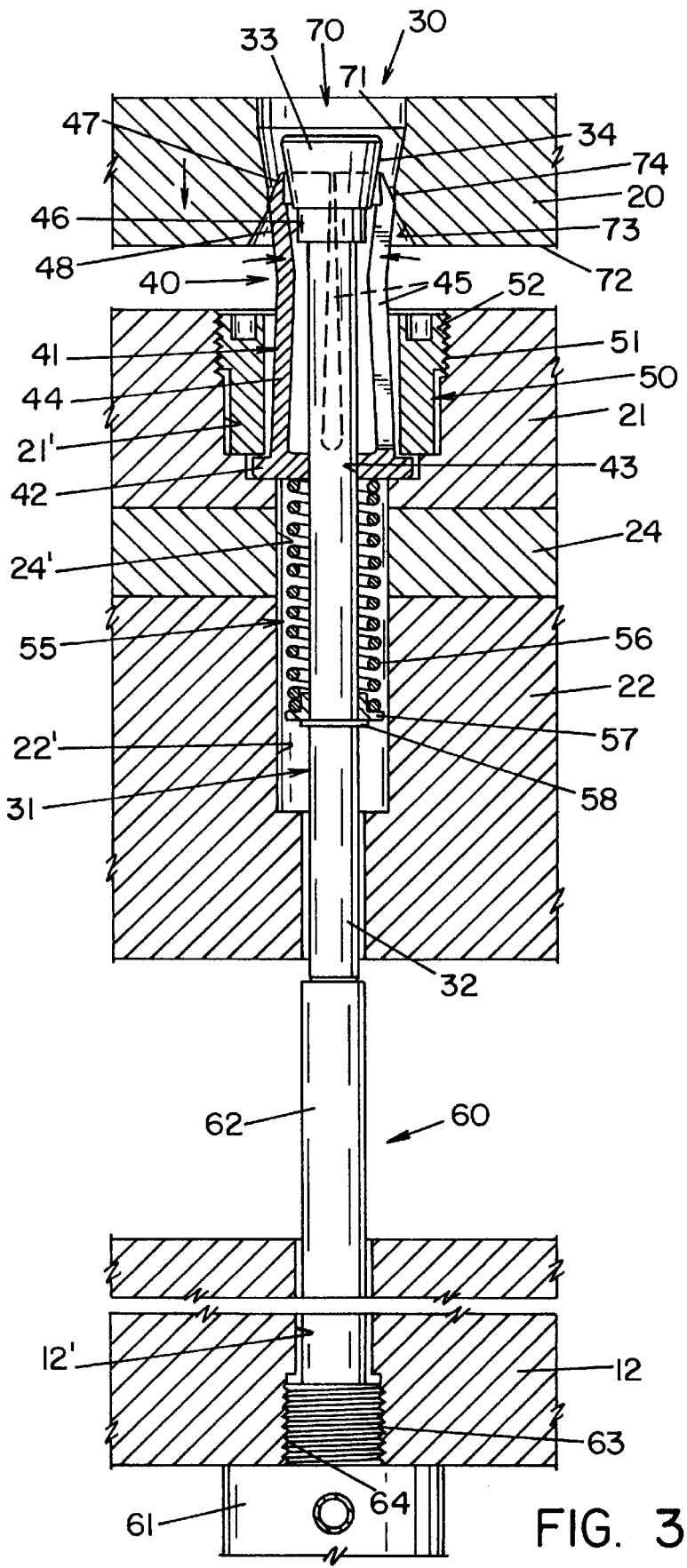
FIG. 3 is an enlarged, fragmentary, vertical sectional view similar to FIG. 2 of the mold clamping assembly depicting the mold plate being fitted over the upper extremity of the mold clamping assembly and aligned with the platen of the tire curing press.
Figure 4:
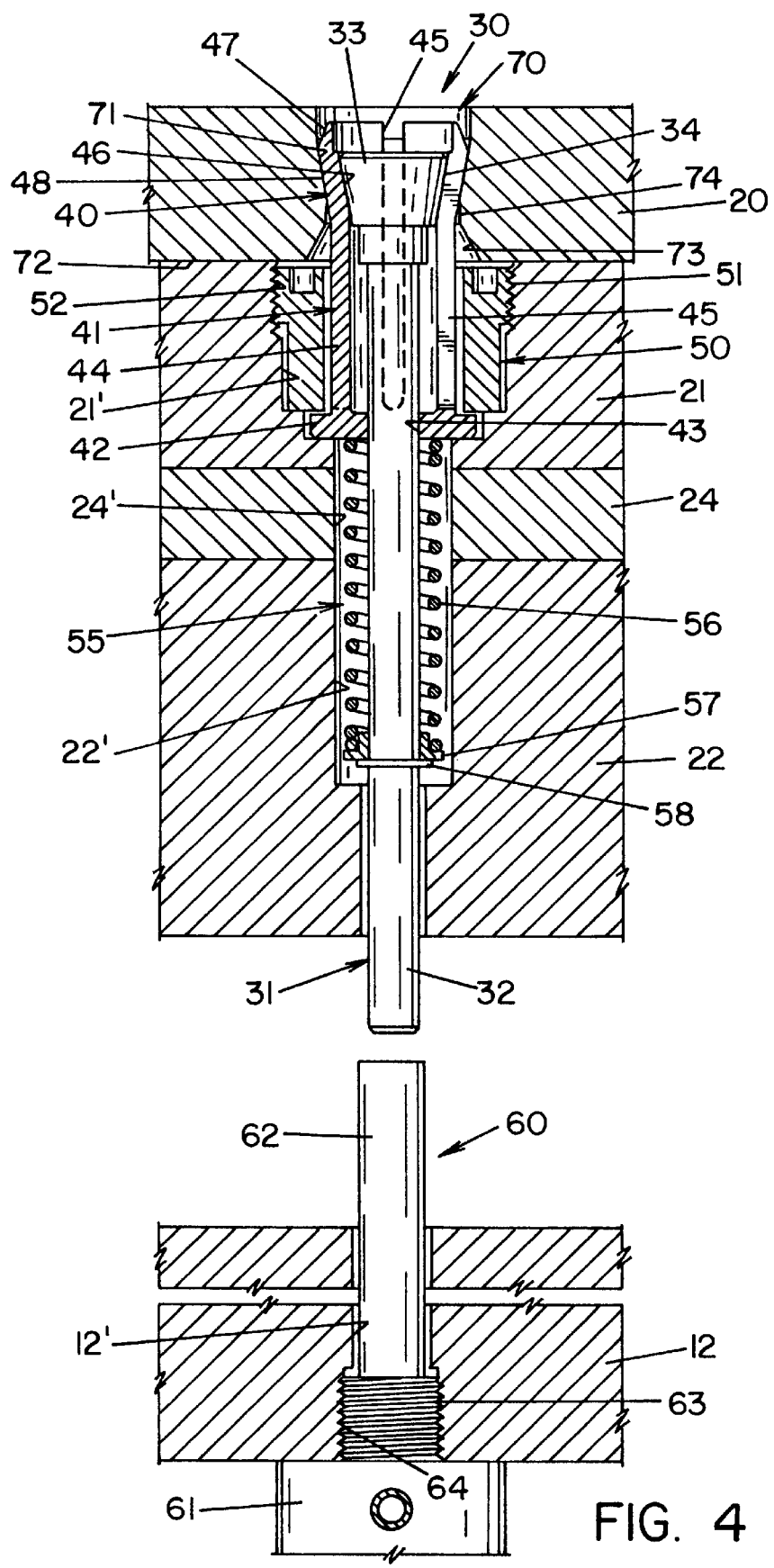
FIG. 4 is an enlarged, fragmentary, vertical sectional view of the mold clamping assembly, taken substantially along the line 4—4 of FIG. 1, and similar to FIGS. 2 and 3, showing the mold plate clamped to the platen of the tire curing press in the position employed for operation of the tire curing press.

Central to mold clamping assembly 30 is a locking rod, generally indicated by the numeral 31, as may be seen in FIGS. 1 and 2. The locking rod 31 has an elongate shaft 32 which extends through multi-size bores 21', 22', and 24' in the lower platen 21, the lower bolster 22, and the lower insulating layer 24, respectively. As best seen in FIGS. 2–4, the shaft 32 of locking rod 31 is of such a length as to extend upwardly beyond lower platen 21 and below bolster 22. The upper axial extremity of shaft 32 has a jam nut 33 rigidly attached thereto. The jam nut 33 has a beveled outer surface 34 which is of progressively larger diameter axially upwardly of the jam nut 33, as best seen in FIG. 2.

Figure 5:
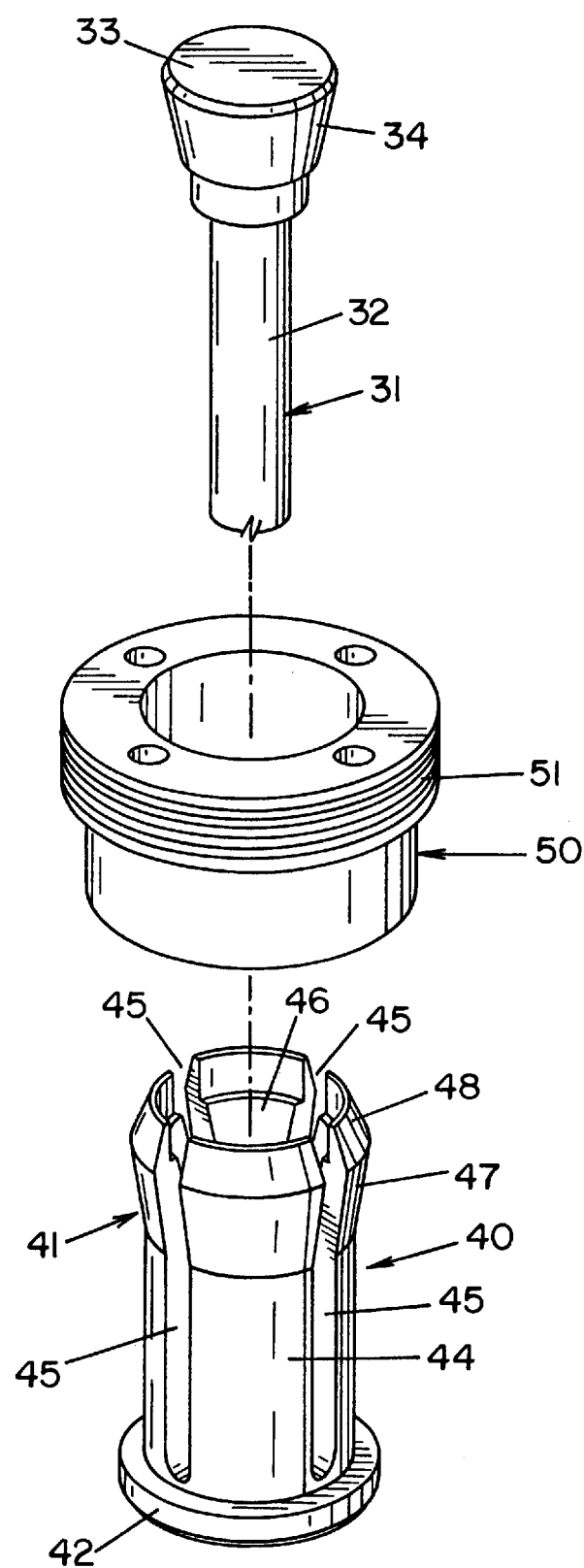
FIG. 5 is an enlarged, exploded perspective view of an operating portion of the mold clamping assembly showing details of the spring collet mechanism and the locking nut which operatively interrelates therewith.

The mold clamping assembly 30 also includes a contractible gripping assembly, generally indicated by the numeral 40. The contractible gripping assembly 40 supports and interacts with the locking rod 31 to control operation of the mold clamping assembly 30. The primary operative component of contractible gripping assembly 40 is a spring collet, generally indicated by the numeral 41, which is best seen in FIGS. 2 and 5 of the drawings. The spring collet 41 has a circular base 42, which is accommodated in a bore 21' of lower platen 21. The circular base 42 has a central aperture 43 adapted to slidingly receive the shaft 32 of the locking rod 31. The spring collet 41 has an annular wall 44 projecting axially from the circular base 42 radially outwardly of the aperture 43. The annular wall 44 is circumferentially discontinuous in having a plurality of axial slots 45 which preferably extend substantially the entire length of annular wall 44. The axial slots 45 permit the annular wall 44 to radially contract or depress from the normal position depicted in FIGS. 2 and 5 upon application of radial forces about the annular wall 44. The contracted position of the annular wall 44 of spring collet 41 is depicted in FIG. 3 of the drawings.

The annular wall 44 of contractible gripping assembly 40 is splayed radially outwardly proximate the end displaced from circular base 42 to form a tapered inner surface 46. The tapered inner surface 46 becomes progressively diametrically larger proximate the upper end of spring collet 41 and is preferably angularly oriented to substantially parallel and thus matingly engage the beveled surface 34 of jam nut 33 when in engagement therewith, as depicted in FIG. 4 of the drawings. The annular wall 44 of spring collet 41 is also provided with a tapered outer surface 47 which may conveniently parallel the tapered inner surface 46 and serves a purpose hereinafter detailed. The upper axial extremity of annular wall 44 of spring collet 41 has a reverse taper lead surface 48 which serves a purpose hereinafter detailed.

Spring collet 41 of contractible gripping assembly 40 is positioned and retained in an annular collet housing 50 which surrounds a portion of the spring collet 41. In particular, collet housing 50 encompasses the annular wall 44 of spring collet 41 in the area proximate the circular base 42 and engages the circular base 42 to apply an axial seating force thereto. The collet housing 50 has external threads 51 adapted to matingly engage threads 52 on the bore 21' in platen 21 to effect positioning of spring collet 41 and to permit disassembly of contractible gripping assembly 40 in the event repair or replacement of the various components is necessary.

Positioning of the locking rod 31 relative to contractible gripping assembly 40 is effected in part by a rod biasing assembly, generally indicated by the numeral 55. The rod biasing assembly 55 includes a coil spring 56 which is telescoped over the shaft 32 of the locking rod 31 and is of a larger internal diameter than the external diameter of the shaft 32. As shown, the coil spring 56 is interposed between the circular base 42 which is in a fixed position and a spring keeper 57 that engages a split ring 58 which is located in a fixed position axially of the shaft 32. The rod biasing assembly 55 thus normally biases the shaft 32 of locking rod 31 to the position depicted in FIG. 4 with the jam nut 33 retracted within and engaging the spring collet 41, thus locking lower mold plate 20 in clamped position on the lower platen 21.

In addition to rod biasing assembly 55 continuously acting on locking rod 31, intermittent control is supplied by the rod actuation assembly, generally indicated by the numeral 60 in FIGS. 1 and 2. The rod actuation assembly 60 consists of a fluid-actuated cylinder 61 having a projecting cylinder rod 62 which extends through a bore 12' in lower housing 12 of the tire curing press 10 in concentric alignment with the shaft 32 of locking rod 31. The cylinder 61 may have a projecting threaded sleeve 63 which engages internal threads 64 in bore 12' in the lower press housing 12 to maintain cylinder 61 in fixed position relative to the lower press housing 12. When the cylinder rod 62 is in the fully retracted position, it is preferably slightly axially spaced from shaft 32 to ensure that rod biasing assembly 55 has moved jam nut 33 of locking rod 31 to the lowermost seated position seen in FIG. 4 to effect maximum clamping of the lower mold plate 20. The cylinder 61 is actuated to extend the cylinder rod 62 only for purposes of releasing jam nut 33 from spring collet 41 prior to lifting of the lower mold plate 20 relative to the lower platen 21 and to maintain the gripping assembly 40 in the position depicted in FIG. 2 while the lower mold plate 20 of an existing mold carrying a lower mold section M is removed from the press 10 and a new lower mold plate 20 with attached lower mold section M is positioned over and lowered over the contractible gripping assembly 40, as seen in FIG. 3. Lower mold plate 20 comes to rest in the seated position of FIG. 4, at which time the cylinder 61 is actuated to retract rod 62 to the position shown in FIG. 4, thereby permitting the rod biasing assembly 55 to clampingly seat in spring collet 41, as previously described.

The lower mold plate 20 is provided with receivers, generally indicated by the numeral 70. In the exemplary embodiment shown in the drawings, three receivers 70 (FIG. 2) would be positioned concentric with the three mold clamping assemblies 30 located as seen in FIG. 6. As best seen in FIG. 2, each receiver 70 has a tapered bore 71 which substantially parallels the tapered outer surface 47 of annular wall 44 of gripping assembly 40 when lower mold plate 20 is in the clamped position depicted in FIG. 4 of the drawings. Lower mold plate 20 is also provided with a platen-engaging surface 72 having as an entry to receiver 70 a reverse taper receiving surface 73 which is adapted to engage reverse taper lead surface 48 at the extremity of annular wall 44 of spring collet 41. Reverse taper receiving surface 73 preferably substantially angularly parallels reverse taper lead surface 48 so as to guide receiver 70 and thus lower mold plate 20 as it is lowered into engagement with gripping assembly 40. Continued lowering of lower mold plate 20 results in radial contraction of spring collet 41 until reverse taper receiving surface 73 passes an inner apex 74 in receiver 70, which is the transition point between tapered bore 71 and reverse taper receiving surface 73. With lower mold plate 20 thus aligned with gripping assembly 40, further lowering of lower mold plate 20 toward lower platen 21 results in expansion of spring collet 41 and seating of jam nut 33 within spring collet 41 when cylinder rod 62 is retracted to allow the rod biasing assembly 55 to act on locking rod 31. It will be appreciated that any number of mold clamping assemblies 30 employed for a particular lower mold plate 20 may simultaneously actuate as the lower mold plate 20 with attached lower mold section M is lowered into a tire curing press 10 and prior to removal of a lower mold plate 20.

It is to be appreciated that upward displacement of lower mold plate 20 from the seated position of FIG. 4 is resisted by a friction force between locking rod 31 and spring collet 41 in addition to the force imparted by coil spring 56. The primary force tending to upwardly displace lower mold plate 20 is occasioned when a cured tire is being stripped from the lower mold section M. Because the tapered bore 71 in receiver 70 of lower mold plate 20 substantially parallels and engages the tapered outer surface 47 of spring collet 41, upward force on lower mold plate 20 tends to radially inwardly deflect or depress annular wall 44 of collet 41. However, with jam nut 33 of locking rod 31 in the position depicted in FIG. 4 with beveled outer surface 34 engaging tapered inner surface 46 of spring collet 41, radial inward deflection of annular wall 44 is resisted. As a result, the stripping force tends to force the jam nut 33 and locking rod 31 upwardly relative to collet 41. Because the angle of beveled outer surface 34 of jam nut 33 is smaller than the friction angle, the friction force between jam nut 33 and collet 41 is greater than the upward force on locking rod 31, thereby maintaining locking rod 31 in the FIG. 4 position to insure that the mold clamping assemblies 30 lock the lower mold plate 20 during tire stripping operations.

Thus, it should be evident that the mold clamping system disclosed herein carries out various of the objects of the present invention set forth above and otherwise constitutes an advantageous contribution to the art. As will be apparent to persons skilled in the art, modifications can be made to the preferred embodiment disclosed herein without departing from the spirit of the invention, the scope of the invention being limited solely by the scope of the attached claims.

We claim:

1. Mold clamping apparatus for selectively detachably securing a lower mold plate mounting a lower mold section relative to a lower platen, lower bolster and lower housing of a tire curing press comprising, a plurality of bores extending through the lower platen, the lower bolster and the lower housing, a tapered bore in the lower mold plate, a locking rod positioned in each of said bores and extending into said tapered bore, a contractible member affixed to the lower platen and extending into said tapered bore when the lower mold plate is seated on the lower platen, a jam nut mounted on said locking rod movable into and out of engagement with said contractible member, and a biasing assembly urging said jam nut into contact with said contractible member for locking said contractible member in said tapered bore to secure the lower mold plate to the lower platen.

2. Apparatus according to claim 1, wherein said contractible member is a spring collet having a tapered outer surface substantially paralleling said tapered bore in said lower mold plate when in operative relation thereto.

3. Apparatus according to claim 2, wherein said spring collet has a tapered inner surface and said jam nut has a beveled outer surface substantially paralleling said tapered bore when in operative relation thereto.

4. Apparatus according to claim 2, wherein a collet housing detachably mounts said spring collet in said lower housing.

5. Apparatus according to claim 2, wherein said spring collet has an aperture through which said locking rod extends.

6. Apparatus according to claim 1, wherein said biasing assembly is a coil spring interposed between said contractible member and a spring keeper affixed axially of said locking rod.

7. Apparatus according to claim 6, wherein said contractible member is a spring collet having a circular base with an aperture receiving said locking rod, said coil spring having one end engaging said circular base of said spring collet and the other end engaging said spring keeper.

8. Apparatus according to claim 7, wherein said spring collet has an annular wall with a plurality of axial slots therein spaced circumferentially about said annular wall.

9. Apparatus according to claim 8, wherein said axial slots extend from said circular base the entire axial extent of said annular wall.

10. Apparatus according to claim 1, wherein the lower mold plate has a platen-engaging surface with a reverse taper receiving surface of said tapered bore extending therefrom for receiving said contractible member.

11. Apparatus according to claim 10, wherein said contractible member has a tapered outer surface substantially paralleling said tapered bore in the lower mold plate and a reverse taper lead surface at the axial extremity of said contractible member for engaging said reverse taper receiving surface of the lower mold plate to align the lower mold plate relative to the lower platen.

12. Apparatus according to claim 1, further comprising an actuator operating on said locking rod to move said jam nut out of contact with said contractible member for removing the lower mold plate from the lower platen.

13. Apparatus according to claim 12, wherein said actuator is a cylinder attached to the lower housing having a cylinder rod in concentric alignment with said locking rod extensible for engaging and displacing the locking rod to remove the lower mold plate and retractable for permitting said biasing assembly to urge said jam nut into contact with said contractible member to secure the lower mold plate.

14. Mold clamping apparatus for selectively detachably securing a lower mold plate mounting a lower mold section relative to a lower platen of a tire curing press comprising, a bore extending through the lower platen, a tapered bore in the lower mold plate, a locking rod extending through said bore in the lower platen and extending into said tapered bore, a contractible member affixed to the lower platen and extending into said tapered bore when the lower mold plate is seated on the lower platen, a jam nut mounted on said locking rod movable into and out of engagement with said contractible member, a biasing assembly urging said jam nut into contact with said contractible member for locking said contractible member in said tapered bore to secure the lower mold plate to the lower platen, and an actuator operative to move said jam nut out of contact with said contractible member for releasing the lower mold plate from the lower platen.

15. Apparatus according to claim 14, wherein said contractible member is a spring collet having a tapered outer surface substantially paralleling said tapered bore in said lower mold plate when in operative relation thereto.

16. Apparatus according to claim 15, wherein said spring collet has a tapered inner surface and said jam nut has a beveled outer surface substantially paralleling said tapered bore when in operative relation thereto.

17. Apparatus according to claim 15, wherein said spring collet has an aperture through which said locking rod extends.

18. Apparatus according to claim 14, wherein said biasing assembly is a coil spring interposed between said contractible member and a spring keeper affixed axially of said locking rod.

19. Apparatus according to claim 14, wherein said actuator is a fluid-operated cylinder extensible for engaging and displacing the jam nut to remove the lower mold plate and retractable to permit said biasing assembly to urge said jam nut into contact with said contractible member to secure the lower mold plate to the lower platen.

20. Apparatus according to claim 14, wherein the contacting surfaces between said contractible member and said jam nut establish a friction force for maintaining said locking rod in position to secure the lower mold plate to the lower platen upon application of forces tending to separate the lower mold plate from the lower platen.

21. Mold clamping apparatus for selectively detachably securing a lower mold plate mounting a lower mold section relative to a lower platen of a tire curing press comprising, a bore extending through the lower platen, a tapered bore in the lower mold plate, a rod positioned in said bore in the lower platen and extending into said tapered bore, a contractible means affixed to the lower platen and extending into said tapered bore when the lower mold plate is seated on the lower platen, jamming means mounted on said rod movable into and out of engagement with said contractible means, a biasing means urging said jamming means into contact with said contractible means for locking said contractible means in said tapered bore to secure the lower mold plate to the lower platen, and actuating means operative to move said jamming means out of contact with said contractible means for releasing the lower mold plate from the lower platen.

* * * * *